(12) United States Patent
Tang

(10) Patent No.: US 11,997,658 B2
(45) Date of Patent: *May 28, 2024

(54) METHOD AND DEVICE FOR INFORMATION TRANSMISSION, AND NON-TRANSITORY COMPUTER READABLE STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/931,461

(22) Filed: Sep. 12, 2022

(65) Prior Publication Data

US 2023/0007652 A1 Jan. 5, 2023

Related U.S. Application Data

(63) Continuation of application No. 16/944,062, filed on Jul. 30, 2020, now Pat. No. 11,457,442, which is a (Continued)

(51) Int. Cl.
*H04W 72/0446* (2023.01)
*H04W 16/14* (2009.01)
(Continued)

(52) U.S. Cl.
CPC ....... *H04W 72/0446* (2013.01); *H04W 16/14* (2013.01); *H04W 72/1268* (2013.01); *H04W 72/23* (2023.01)

(58) Field of Classification Search
CPC ............ H04W 72/0446; H04W 72/23; H04W 72/1268; H04W 16/14
(Continued)

(56) References Cited

U.S. PATENT DOCUMENTS 11,457,442 B2 * 9/2022 Tang ................. H04W 72/1268
2014/0161085 A1 6/2014 Kim
(Continued)

FOREIGN PATENT DOCUMENTS

CN 101605375 A 12/2009
CN 101801093 A 8/2010
(Continued)

OTHER PUBLICATIONS

Intel Corporation, R1-167123, "Forward compatibility considerations for NR unlicensed operation", 3GPP RAN WG1 #86, 3GPP (Aug. 13, 2016). 7 pages.
(Continued)

*Primary Examiner* — Peter G Solinsky
(74) *Attorney, Agent, or Firm* — PERKINS COIE LLP

(57) ABSTRACT

A method for information transmission includes that: a network device determines a first time-domain resource available on a first carrier, where the first carrier is an unlicensed carrier and the first time-domain resource is in a first downlink transmission burst; and the network device sends first information to a terminal device through the first time-domain resource on the first carrier, where the first information is used to indicate time-domain resource information of a first transmission burst according to a first subcarrier spacing.

19 Claims, 3 Drawing Sheets

Related U.S. Application Data continuation of application No. PCT/CN2018/075122, filed on Feb. 2, 2018.

(51) Int. Cl.
  *H04W 72/1268* (2023.01)
  *H04W 72/23* (2023.01)

(58) Field of Classification Search
  USPC .......................................................... 370/329
  See application file for complete search history.

(56) References Cited

U.S. PATENT DOCUMENTS

| | | | |
|---|---|---|---|
| 2016/0234706 | A1 | 8/2016 | Liu et al. |
| 2017/0164350 | A1 | 6/2017 | Sun |
| 2017/0251464 | A1 | 8/2017 | Mukherjee |
| 2019/0013982 | A1 | 1/2019 | Sun |
| 2019/0394009 | A1 | 12/2019 | Yoshimoto et al. |
| 2020/0213173 | A1 | 7/2020 | Sun et al. |

FOREIGN PATENT DOCUMENTS

| | | |
|---|---|---|
| CN | 105991211 A | 10/2016 |
| CN | 107027184 A | 8/2017 |
| EP | 3579612 A1 | 12/2019 |
| RU | 2573639 C2 | 1/2016 |
| WO | 2016004634 A1 | 1/2016 |
| WO | 2016119219 A1 | 8/2016 |
| WO | 2017193334 A1 | 11/2017 |

OTHER PUBLICATIONS

ZTE et al., R1-1701619, "Discussion on NR operation in unlicensed spectrum", 3GPP TSG RAN WG1 #88, 3GPP (Feb. 6, 2017). 8 pages.
First Office Action of the Korean application No. 10-2020-7023049, dated Nov. 23, 2022. 9 pages with X English translation.
Pre-Interview Communication of the U.S. Appl. No. 16/944,062, dated Mar. 3, 2022.
Interview Summary of the U.S. Appl. No. 16/944,062, dated Apr. 8, 2022.
Notice of Allowance of the U.S. Appl. No. 16/944,062, dated May 18, 2022.
Supplementary European Search Report in the European application No. 22162335.8, dated Jun. 22, 2022.
MCC Support, Final Report of 3GPP TSG RAN WG1 #83 v1.0.0 (Anaheim, USA, Nov. 15-22, 2015)3GPP TSG RAN WG1 Meeting #84 R1-160236 St Julian's, Malta, Feb. 15-19, 2016.
English translation of the Written Opinion of the International Search Authority in the international application No. PCT/CN2018/075122, dated Sep. 13, 2018.
First Office Action of the Russian application No. 2020128617, dated Jun. 7, 2021.
3GPP TSG RAN WG1 Meeting #91 R1-1719841, Reno, USA, Nov. 27-Dec. 1, 2017, Agenda Item: 6.8; Source: Huawei, HiSilicon; Title: Coexistence and channel access for NR-based unlicensed band operation.
First Office Action of the Chinese application No. 202010607209.X, dated Jul. 27, 2021.
First Office Action of the Canadian application No. 3090448, dated Aug. 18, 2021.
Huawei et al, "NR frame structure on unlicensed bands", 3GPP TSG RAN WG1 Adhoc Meeting R1-1800040, Vancouver, Canada, Jan. 22-26, 2018. 7 pages.
MediaTek Inc, "Design of GC PDCCH", 3GPP TSG RAN WG1 Meeting 90bis R1-1718324, Prague, CZ, Oct. 13-19, 2017. 4 pages.
Notice of Allowance of the Korean appliation No. 10-2020-7023049, dated May 17, 2023. 3 pages with English translation.
First Office Action of the Australian application No. 2018406790, dated Aug. 4, 2023. 4 pages.
Office Action of the Indian application No. 202017035662, dated Nov. 17, 2021.
CATT, "Group-common PDCCH structure and configuration", 3GPP TSG RAN WG1 Meeting #89 R1-1707500, Hangzhou, P. R. China, May 15-19, 2017.
MediaTek Inc, "Contents of GC PDCCH", 3GPP TSG RAN WG1 Meeting #90 R1-17xxxxx, Prague, P.R. Czechia Aug. 21-25, 2017.
First Office Action of the Japanese application No. 2020-541754, dated Nov. 26, 2021.
Mediatek Inc: "Design of GC PDCCH", 3GPP Draft; R1-1716200 Design of GC PDCCH_Final, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017 (Sep. 17, 2017), XP051339658, Retrieved from the Internet: URL: http://www.3gpp.org/ftp/Meetings_3GPP_SYNC/RAN1/Docs/[ retrieved on Sep. 17, 2017]* Sections 1, 2, 3, 6*.
Qualcomm Incorporated: "Remaining issues on slot format indication", 3GPP Draft; R1-1718556_SFI_Remaining, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 3, 2017 (Oct. 3, (2017), XP051353123, Retrieved from the Internet: URL: http://www.3gpp.org/ftp/tsg_ran/WG1_RL1/TSGR1_90b/Docs/[ retrieved on Oct. 3, 2017]* Sections 1, 3.2, 4.3 *.
Supplementary European Search Report in the European application No. 18903179.2, dated Dec. 22, 2020.
International Search Report in the international application No. PCT/CN2018/075122, dated Sep. 13, 2018.

* cited by examiner

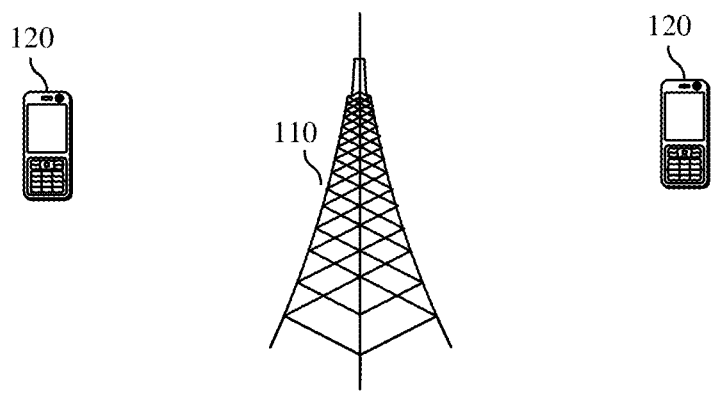

A network device determines a first time-domain resource available on a first carrier, the first time-domain resource being in a first downlink transmission burst — S210

The network device sends first information to a terminal device through the first time-domain resource on the first carrier, the first information being used to indicate that time-domain resource information of a first transmission burst needs to be determined according to a first subcarrier spacing — S220

FIG. 2

METHOD AND DEVICE FOR INFORMATION TRANSMISSION, AND NON-TRANSITORY COMPUTER READABLE STORAGE MEDIUM

CROSS-REFERENCE TO RELATED APPLICATION

This application is a continuation of U.S. application Ser. No. 16/944,062 filed on Jul. 30, 2020, which is a U.S. continuation application of International Application No. PCT/CN2018/075122, entitled "INFORMATION TRANSMISSION METHOD AND DEVICE", filed on Feb. 2, 2018. The contents of these applications are hereby incorporated by reference in their entirety.

TECHNICAL FIELD

The disclosure relates to the field of communications, and more particularly to a method and device for information transmission.

BACKGROUND

In a long-term evolution-based licensed-assisted access (LAA-LTE) system, services are provided for a terminal device by taking a carrier on a licensed spectrum as a primary carrier and taking a carrier on an unlicensed spectrum as a secondary carrier. A communication device follows a "listen before talk (LBT)" principle on an unlicensed spectrum, namely the communication device, before sending a signal on a channel of the unlicensed spectrum, is required to monitor the channel at first, the communication device may send the signal only when a channel monitoring result is that the channel is idle, and if the channel monitoring result of the communication device for the channel of the unlicensed spectrum is that the channel is busy, the communication device may not send the signal.

Since data transmission of a communication device is opportunistic, data may be transmitted only when LBT succeeds and no data may be transmitted when LBT fails, a network device and a terminal device in a cell served by the network device are required to know when the opposite party starts data transmission and stops data transmission so as to implement correct data communication between the terminal device and the network device.

When a new radio (NR) technology is applied to an unlicensed spectrum, multiple subcarrier spacings and broadband transmission are supported.

SUMMARY

The embodiments of the disclosure provide a method and device for information transmission, and a non-transitory computer readable storage medium.

A first aspect provides a method for information transmission, which includes the following operations:
  a network device determines a first time-domain resource available on a first carrier, where the first carrier is an unlicensed carrier and the first time-domain resource is in a first downlink transmission burst; and
  the network device sends first information to a terminal device through the first time-domain resource on the first carrier, where the first information is used to indicate time-domain resource information of a first transmission burst according to a first subcarrier spacing;
  where the time-domain resource information includes at least one of:
    an end of the first transmission burst; a channel occupancy duration; or a slot format of a transmission burst;
    the first information is further used to indicate time-domain resource information of a third transmission burst according to a second subcarrier spacing,
    the third transmission burst includes at least one of:
    a fourth downlink transmission burst on the first carrier;
    a fourth uplink transmission burst on the first carrier;
    a fifth downlink transmission burst on a second carrier; or,
    a fifth uplink transmission burst on the second carrier, and
    a frequency-domain resource corresponding to the third transmission burst does not overlap with the frequency-domain resource corresponding to the first transmission burst.

A second aspect provides a device for information transmission, which includes:
  a processor; and
  a memory storing computer readable instructions executable by the processor,
  the processor is configured to:
  determine a first time-domain resource available on a first carrier, where the first carrier is an unlicensed carrier and the first time-domain resource is in a first downlink transmission burst; and
  send, through an output interface, first information to a terminal device through the first time-domain resource on the first carrier, where the first information is used to indicate time-domain resource information of a first transmission burst according to a first subcarrier spacing;
  where the time-domain resource information includes at least one of:
  an end of the first transmission burst; a channel occupancy duration; or a slot format of a transmission burst;
  the first information is further used to indicate time-domain resource information of a third transmission burst according to a second subcarrier spacing,
  the third transmission burst includes at least one of:
  a fourth downlink transmission burst on the first carrier;
  a fourth uplink transmission burst on the first carrier;
  a fifth downlink transmission burst on a second carrier; or,
  a fifth uplink transmission burst on the second carrier, and
  a frequency-domain resource corresponding to the third transmission burst does not overlap with the frequency-domain resource corresponding to the first transmission burst.

A third aspect provides a non-transitory computer storage medium, which is configured to store computer software instructions for executing the method in the first aspect, including a program designed to execute the abovementioned aspect.

BRIEF DESCRIPTION OF THE DRAWINGS

FIG. 1 is a schematic diagram of a communication system according to an embodiment of the disclosure.

FIG. 2 is a schematic flowchart of a method for information transmission according to an embodiment of the disclosure.

DETAILED DESCRIPTION

Figure 3:
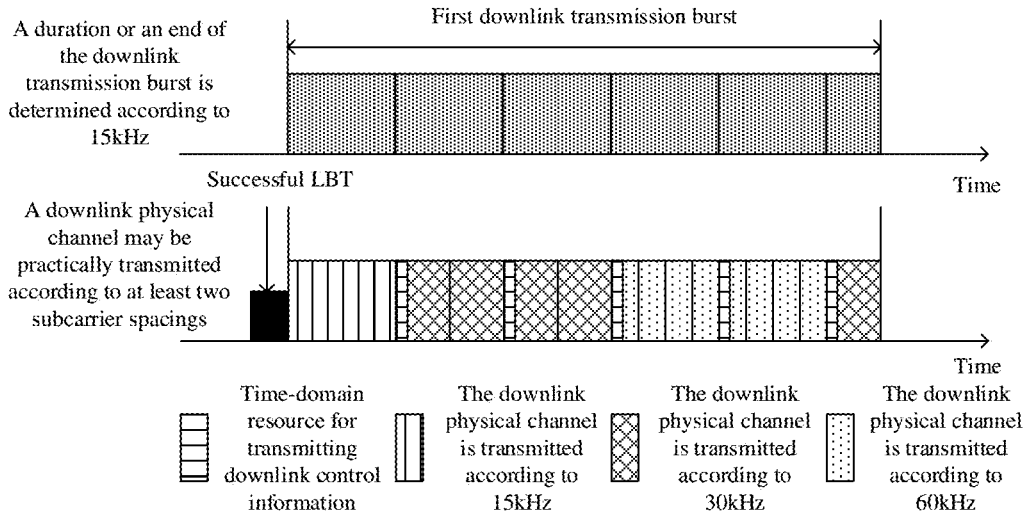
FIG. 3 is a schematic diagram of an example of a method for information transmission according to an embodiment of the disclosure.

In the related art, when a new radio (NR) technology is applied to an unlicensed spectrum, multiple subcarrier spacings and broadband transmission are supported. Under such a circumstance, how to determine a position of a resource for data transmission to implement normal data communication between a terminal device and a network device is a problem urgent to be solved.

The technical solutions in the disclosure will be described below in combination with the drawings.

Terms "part", "module", "system" and the like used in the specification are adopted to represent a computer related entity, hardware, firmware, hardware and software combination, software, or software in execution. For example, a part may be, but not limited to, a process running on a processor, the processor, an object, an executable file, an execution thread, a program and/or a computer. The drawings show that an application running on a computing device and the computing device may both be parts. One or more parts may reside in a process or an execution thread, and the parts may be located on a computer and/or distributed among two or more computers. In addition, these parts may be executed from various computer-readable media with various data structures stored therein. The "parts" may communicate through local or remote processes according to, for example, signals with one or more data groups (for example, data from two parts interacting with another part of a local system, a distributed system or a network, for example, the Internet interacting with another system through signals).

The embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), an LTE system, an Advanced Long Term Evolution (LTE-A) system, an LTE-based access to unlicensed spectrum (LTE-U) system, an NR system, an evolved system of the NR system such as an NR-based access to unlicensed spectrum (NR-U) system, a Universal Mobile Telecommunication System (UMTS), a Wireless Local Area Network (WLAN), a Wireless Fidelity (WiFi), or a next-generation communication system.

Generally speaking, connections supported by a conventional communication system are usually limited in number and also easy to implement. However, with the development of communication technologies, a mobile communication system will not only support conventional communication but also support, for example, Device to Device (D2D) communication, Machine to Machine (M2M) communication, Machine Type Communication (MTC), and Vehicle to Vehicle (V2V) communication.

A communication system in the embodiments of the disclosure may be applied to a Carrier Aggregation (CA) scenario, may also be applied to a Dual Connectivity (DC) scenario and may further be applied to a Standalone (SA) network deployment scenario.

The embodiments of the disclosure are described in combination with a network device and a terminal device.

The terminal device may also be called User Equipment (UE), an access terminal, a user unit, a user Station (ST), a mobile radio ST, a mobile ST, a remote ST, a remote terminal, a mobile device, a user terminal, a terminal, a wireless communication device, a user agent, a user device or the like. The terminal device may be an ST in a WLAN, and may be a cell phone, a cordless phone, a Session Initiation Protocol (SIP) phone, a Wireless Local Loop (WLL) ST, a Personal Digital Assistant (PDA), a handheld device with a wireless communication function, a computing device, another processing device connected to a wireless modem, a vehicle device, a wearable device, a terminal device in a next-generation communication system, for example, a future fifth-Generation (5G) network, a terminal device in a future evolved Public Land Mobile Network (PLMN) or the like.

Exemplarily but unlimitedly, in the embodiments of the disclosure, the terminal device may also be a wearable device. The wearable device may also be called a wearable intelligent device and is a generic term of wearable devices obtained by performing intelligentization designing and development on daily wearing products, for example, glasses, gloves, watches, clothes and shoes. The wearable device is a portable device directly worn or integrated to clothes or accessory of a user. The wearable device not only is a hardware device but also realizes powerful functions through software support, data interaction and cloud interaction. Generalized wearable intelligent device includes, for example, intelligent watches or intelligent glasses with complete functions and large sizes and capable of realizing all or part of functions independently of intelligent phones, and for example, various types of intelligent bands and intelligent jewelries of which each is dedicated to application functions of a certain type and required to be matched with other devices such as intelligent phones for use.

The network device may be a device configured to communicate with a mobile device, and the network device may be an Access Point (AP) in the WLAN, a Base Transceiver Station (BTS) in the GSM or CDMA, may also be a NodeB (NB) in WCDMA, and may further be an Evolutional Node B (eNB or eNodeB) in LTE, or a relay ST or AP, or a vehicle device, a wearable device, a network device in the future 5G network, a network device in the future evolved PLMN or the like.

In the embodiments of the disclosure, the network device provides service for a cell, and the terminal device communicates with the network device through a transmission resource (for example, a frequency-domain resource or a spectrum resource) for the cell. The cell may be a cell corresponding to the network device (for example, a base ST). The cell may be served by a macro base station, and may also be served by a base station corresponding to a small cell. Here, the small cell may include: a metro cell, a micro cell, a pico cell, a femto cell and the like. These small cells have the characteristics of small coverage and low transmitted power and are applied to provision of high-rate data transmission service.

In the embodiments of the disclosure, multiple cells may simultaneously work on the same frequency on a carrier in an LTE system or a 5G system, and in some special scenarios, concepts of carrier and cell may also be considered to be equivalent. For example, in a CA scenario, when a secondary carrier is configured for UE, both a carrier index of the secondary carrier and a cell Identity (ID) of a secondary cell working on the secondary carrier may be contained, and under this condition, the concepts of carrier and cell may be considered to be equivalent. For example, for the UE, access to a carrier and access to a cell are equivalent.

It is to be noted that a downlink physical channel in the embodiments of the disclosure may include a Physical Downlink Control Channel (PDCCH), an Enhanced Physical Downlink Control Channel (EPDCCH), a Physical Downlink Shared Channel (PDSCH), a Physical Hybrid Automatic Repeat reQuest (ARQ) Indicator Channel (PHICH), a Physical Multicast Channel (PMCH), a Physical Broadcast Channel (PBCH) and the like. A downlink reference signal may include a downlink synchronization signal, a Phase Tracking Reference Signal (PT-RS), a downlink DeModulation Reference Signal (DMRS), a Channel State Information-Reference Signal (CSI-RS) and the like. The downlink synchronization signal may be used for network access and radio resource management and measurement of a communication device, the downlink DMRS may be used to demodulate a downlink channel, the CSI-RS may be used to measure the downlink channel, and the PT-RS may be used for downlink time-frequency synchronization or phase tracking. It is to be understood that the embodiments of the disclosure may involve downlink physical channels or downlink reference signals that are the same in name but different in function with those mentioned above and may also involve downlink physical channels or downlink reference signals that are different in name but the same in function with those mentioned above. There are no limits made thereto in the disclosure.

It is to be noted that an uplink physical channel in the embodiments of the disclosure may include a Physical Random Access Channel (PRACH), a Physical Uplink Control Channel (PUCCH), a Physical Uplink Shared Channel (PUSCH) and the like. An uplink reference signal may include an uplink DMRS, a Sounding Reference Signal (SRS), a PT-RS and the like. The uplink DMRS may be used to demodulate an uplink channel, the SRS may be used to measure the uplink channel, and the PT-RS may be used for uplink time-frequency synchronization or phase tracking. It is to be understood that the embodiments of the disclosure may involve uplink physical channels or uplink reference signals that are the same in name but different in function with those mentioned above and may also involve uplink physical channels or uplink reference signals that are different in name but the same in function with those mentioned above. There are no limits made thereto in the disclosure.

FIG. 1 is a schematic diagram of a communication system according to an embodiment of the disclosure. As illustrated in FIG. 1, the communication system 100 includes a network device 110 and a terminal device 120.

Any implementation manner of the abovementioned network device may be adopted for the network device 110, and any implementation manner of the abovementioned terminal device may be adopted for the terminal device 120. Elaborations are omitted herein.

It is to be understood that the communication system 100 may be a PLMN or a D2D network or an M2M network or another network. FIG. 1 is only a simplified schematic diagram listed as an example, and the network may further include another network device which is not presented in FIG. 1.

In the embodiment of the disclosure, frequency-domain resources for wireless communication (for example, uplink transmission or downlink transmission) between the network device and the terminal device are frequency-domain resources used based on a contention mechanism.

For example, the network device and/or the terminal device may detect whether a frequency-domain resource with a certain bandwidth (for example, 20 MHz) is presently in an idle state or not or whether the frequency-domain resource is used by another device or not. If the frequency-domain resource is in the idle state or the frequency-domain resource is not used by another device, the network device and/or the terminal device may use the frequency-domain resource for communication, for example, for uplink transmission or downlink transmission. If the frequency-domain resource is not in the idle state or the frequency-domain resource has been used by another device, the network device and/or the terminal device may not use the frequency-domain resource.

Exemplarily but unlimitedly, in the embodiment of the disclosure, a frequency-domain resource used by the communication system 100 (or a frequency-domain resource used by the network device and the terminal device based on the contention mechanism) may also be a licensed spectrum resource, namely the communication system 100 in the embodiment of the disclosure is a communication system that a licensed band is available for, and moreover, each communication device (the network device and/or the terminal device) in the communication system 100 may use a frequency-domain resource of the licensed band in a contention manner. A "licensed frequency-domain resource" may also be called a "licensed spectrum resource" or a "licensed carrier", and refers to a frequency-domain resource required to be approved by the national or local radio committee for use.

Alternatively, in the embodiment of the disclosure, the frequency-domain resource used by the communication system 100 (or the frequency-domain resource used by the network device and/or the terminal device based on the contention mechanism) may be an unlicensed frequency-domain resource. The "unlicensed frequency-domain resource" may also be called an "unlicensed spectrum resource" or an "unlicensed carrier", and refers to a resource that may be shared by communication devices on an unlicensed band.

Exemplarily but unlimitedly, in the embodiment of the disclosure, the unlicensed spectrum resource may include a band nearby 5 Giga Hertz (GHz), a band nearby 2 GHz, a band nearby 3.5 GHz, a band nearby 37 GHz and a band nearby 60 GHz.

A method for information transmission in the embodiments of the disclosure will be described below in combination with FIG. 2 to FIG. 4. It is to be noted that the embodiments of the disclosure mainly involve a determination manner for a time-domain resource. A determination manner for a frequency-domain resource may be the same as or similar to that in a related art and, for avoiding elaborations, will not be described in detail herein.

Figure 4:
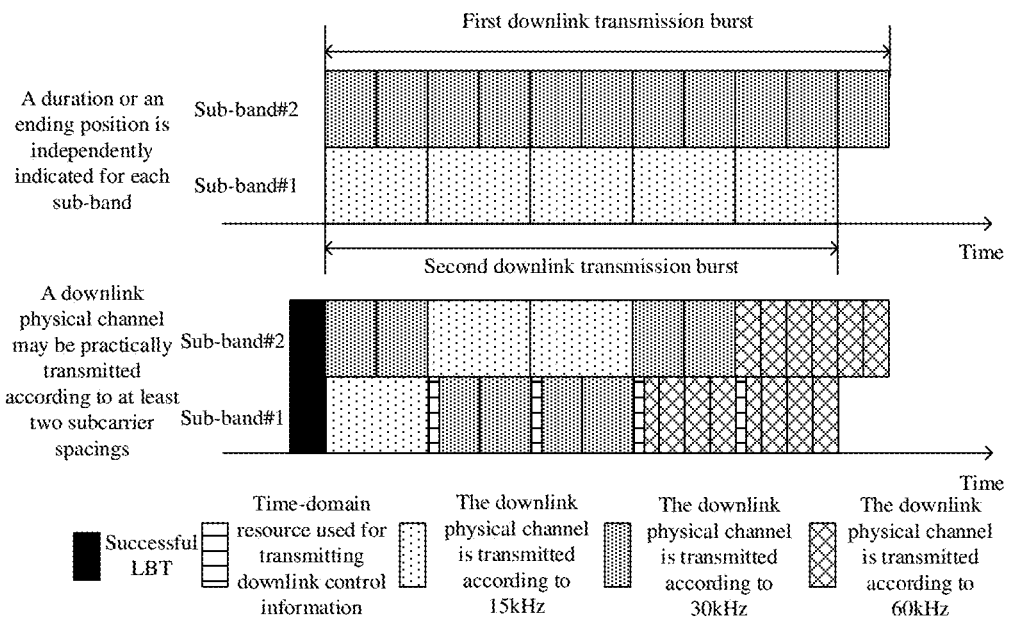
FIG. 4 is a schematic diagram of another example of a method for information transmission according to an embodiment of the disclosure.

It is to be understood that FIG. 2 to FIG. 4 are schematic flowcharts of the method for information transmission in the embodiments of the disclosure and show detailed communication steps or operations of the method. However, these steps or operations are only exemplary. Other operations or transformations of each operation in FIG. 2 to FIG. 4 may also be executed in the embodiments of the disclosure.

In addition, each step in FIG. 2 to FIG. 4 may be executed in sequences different from those presented in FIG. 2 to FIG. 4 respectively, and not all the operations in FIG. 2 to FIG. 4 may be executed.

FIG. 2 is a schematic flowchart of a method for information transmission according to an embodiment of the disclosure. As illustrated in FIG. 2, the method 200 includes the following contents.

In S210, a network device determines a first time-domain resource available on a first carrier, the first time-domain resource being a time-domain resource in a first downlink transmission burst.

In S220, the network device sends first information to a terminal device through the first time-domain resource on the first carrier. The first information is used to indicated that time-domain resource information of a first transmission burst needs to be determined according to a first subcarrier spacing.

Therefore, the network device may send the first information to the terminal device through the time-domain resource in the first transmission burst on the first carrier and indicate a determination manner for the time-domain resource information of the first transmission burst (which may include, for example, an uplink transmission burst and/or a downlink transmission burst) through the first information, and in such a manner, the terminal device and the network device may reach an agreement on a time-domain resource position of the first transmission burst, and correct data communication between the terminal device and the network device may be implemented.

It is to be noted that, in the embodiment of the disclosure, the first carrier is an unlicensed carrier, namely the first information may be used to indicate a determination manner for time-domain resource information of a transmission burst on the unlicensed carrier.

Optionally, in the embodiment of the disclosure, the first time-domain resource used for sending the first information may be a time-domain resource configured by the network device to transmit a downlink control channel in the first downlink transmission burst, for example, a time-domain resource in a Control Resource Set (CORESET).

It is to be understood that, in the embodiment of the disclosure, a downlink transmission burst may be defined as one or more time units for continuous transmission of the network device, and similarly, an uplink transmission burst may be defined as one or more time units for continuous transmission of the terminal device. One time unit may be one or more subframes, may also be one or more slots, and may also be one or more mini-slots or symbols, etc. A starting time unit and/or ending time unit of a downlink transmission burst or an uplink transmission burst may be a complete time unit and may also be part of a time unit, etc. There are no limits made thereto in the embodiment of the disclosure.

Optionally, in the embodiment of the disclosure, the time-domain resource information may include at least one of: a starting position; an ending position; a channel occupancy duration; or, a slot format; or, the time-domain resource information may also be other information capable of reflecting the time-domain resource position. There are no special limits made thereto in the embodiment of the disclosure.

For example, the time-domain resource information of the first transmission burst may include a starting position, for example, a starting symbol or a starting slot, of the first transmission burst.

Or, the time-domain resource information of the first transmission burst may include an ending position, for example, an ending symbol or an ending slot, of the first transmission burst.

Or, the time-domain resource information of the first transmission burst may include a channel occupancy duration in the first transmission burst, i.e., a duration, for example, a number of subframes or a number of slots, occupied by channel transmission in the first transmission burst.

Or, the time-domain resource information of the first transmission burst may include the slot format of the first transmission burst. For example, the slot format of the first transmission burst may indicate slot formats in one or more slots in a bitmap manner; or, the slot format of the first transmission burst may also indicate the number of downlink symbols and/or the number of uplink symbols in a slot; or, the slot format of the first transmission burst may indicate a slot format index in a slot, and the slot format index may be used to indicate a specific slot format. An indication manner for the slot format of the first transmission burst is not specially limited in the embodiment of the disclosure.

Optionally, in the embodiment of the disclosure, the first transmission burst may include at least one of the first downlink transmission burst on the first carrier or a first uplink transmission burst on the first carrier, namely the network device may not only indicate time-domain resource information of the downlink transmission burst on the first carrier through the first indication but also indicate time-domain resource information of the uplink transmission burst on the first carrier through the first information, so that the terminal device and the network device may reach an agreement on time-domain resource positions of the downlink transmission burst and/or uplink transmission burst on the first carrier, and correct data communication between the terminal device and the network device may be implemented.

Optionally, in some embodiments, a frequency-domain resource where the first uplink transmission burst on the first carrier is located at least partially overlaps with a frequency-domain resource where the first downlink transmission burst on the first carrier is located. For example, the first downlink transmission burst on the first carrier and the first uplink transmission burst on the first carrier may be on the same sub-band of the first carrier.

It is to be understood that, in the embodiment of the disclosure, the first subcarrier spacing used for determining the time-domain resource information of the first transmission burst may be a subcarrier spacing defined by a communication system, or, the first subcarrier spacing may be a subcarrier spacing configured by the network device, or, the first subcarrier spacing may also be a subcarrier spacing used for the network device to transmit downlink control information, etc. There are no limits made thereto in the embodiment of the disclosure.

Optionally, a size of the first subcarrier spacing is less than or equal to a size of a subcarrier spacing used for physical channel transmission on the first carrier.

An indication manner for the first information will be described below in detail.

First embodiment: the first information may further be used to indicate that time-domain resource information of a second transmission burst needs to be determined according to the first subcarrier spacing, and the second transmission burst may include at least one of the following:
a second downlink transmission burst on the first carrier;
a second uplink transmission burst on the first carrier;
a third downlink transmission burst on a second carrier; or
a third uplink transmission burst on the second carrier.

A frequency-domain resource where the second transmission burst is located does not overlap with a frequency-domain resource where the first transmission burst is located.

That is, the first information may not only indicate that the time-domain resource information of the first transmission burst needs to be determined according to the first subcarrier spacing but also indicate that the time-domain resource information of the second transmission burst needs to be determined according to the first subcarrier spacing, namely the network device may indicate that both the time-domain resource information of the first transmission burst and the time-domain resource information of the second transmission burst need to be determined according to the same subcarrier spacing. According to frequency-domain positions of the first transmission burst and the second transmission burst, the following two scenarios may be included.

A first scenario: the first transmission burst and the second transmission burst may be on different sub-bands of the same carrier. For example, the first carrier may include a first sub-band and a second sub-band, the first transmission burst may be on the first sub-band of the first carrier, and the second transmission burst may be on the second sub-band of the first carrier. Specifically, the first transmission burst may include the first uplink transmission burst and/or first downlink transmission burst on the first sub-band of the first carrier, and the second transmission burst may include the second uplink transmission burst and/or second downlink transmission burst on the second sub-band of the first carrier.

A second scenario: the first transmission burst and the second transmission burst may be on different carriers. For example, the first transmission burst is on the first carrier, and the second transmission burst is on the second carrier. The first transmission burst may include the first uplink transmission burst and/or first downlink transmission burst on the first carrier, and the second transmission burst may include the third downlink transmission burst and/or third uplink transmission burst on the second carrier. Optionally, the third downlink transmission burst on the second carrier and the third uplink transmission burst on the second carrier may be on the same sub-band of the second carrier.

To sum up, in the first embodiment, the first information transmitted on the first carrier may be used to indicate that time-domain resource information of transmission bursts on at least two sub-bands of the first carrier needs to be determined according to the same subcarrier spacing, i.e., the first scenario. Time-domain resource positions of the transmission bursts on the at least two sub-bands may be the same, and under this condition, the first information may only indicate only one piece of time-domain resource information. Or, the time-domain resource positions of the transmission bursts on the at least two sub-bands may be different, and under this condition, the first information may be used to indicate the time-domain resource position of the transmission burst on each of the at least two sub-bands.

Or, the first information transmitted on the first carrier may not only be used to indicate the determination manner for the time-domain resource information of the first transmission burst on the first carrier but also be used to indicate a determination manner for time-domain resource information of the second transmission burst on another carrier, for example, the second carrier. That is, the first information may be used to indicate determination manners for time-domain resources of transmission bursts on at least two carriers. The subcarrier spacing used for determining the time-domain resource information of the first transmission burst on the first carrier and the subcarrier spacing used for determining the time-domain resource information of the second transmission burst on the second carrier may be the same, i.e., the second scenario.

Optionally, in the embodiment of the disclosure, the second carrier may be an unlicensed carrier different from the first carrier.

In a specific implementation of the first embodiment, the first information is used to indicate that a first ending position of the first transmission burst needs to be determined according to the first subcarrier spacing, and the first information is further used to indicated that a second ending position of the second transmission burst needs to be determined according to the first subcarrier spacing, an interval between the first ending position and the second ending position being less than or equal to a first preset value.

Optionally, in some embodiments, the first preset value may be 1 ms.

For example, in the first scenario, ending positions of the transmission bursts on the at least two sub-bands of the first carrier may be different, and under this condition, a time interval between the ending positions of the transmission bursts on the at least two sub-bands is no more than the first preset value.

Or, in the second scenario, the ending position of the transmission burst on the first carrier and the ending position of the transmission burst on the second carrier may also be different, and under this condition, a time interval between the ending position of the transmission burst on the first carrier and the ending position of the transmission burst on the second carrier is no more than the first preset value.

Second embodiment: the first information may further be used to indicate that time-domain resource information of a third transmission burst needs to be determined according to a second subcarrier spacing, and the third transmission burst includes at least one of the following:

a fourth downlink transmission burst on the first carrier;
a fourth uplink transmission burst on the first carrier;
a fifth downlink transmission burst on the second carrier; or,
a fifth uplink transmission burst on the second carrier.

A frequency-domain resource where the third transmission burst is located does not overlap with the frequency-domain resource where the first transmission burst is located.

That is, the first information may not only be used to indicate that the time-domain resource information of the first transmission burst needs to be determined according to the first subcarrier spacing but also be used to indicate that the time-domain resource information of the third transmission burst needs to be determined according to a subcarrier spacing that is not the first subcarrier spacing, for example, the second subcarrier spacing. According to frequency-domain positions of the first transmission burst and the third transmission burst, the following two scenarios may be included.

A third scenario: the first transmission burst and the third transmission burst may be on different sub-bands of the same carrier. For example, the first carrier may include the first sub-band and the second sub-band, the first transmission burst may be on the first sub-band of the first carrier, and the third transmission burst may be on the second sub-band of the first carrier. That is, the first information may be used to indicate that time-domain resource information of transmission bursts on different sub-bands of the first carrier needs to be determined according to different subcarrier spacings. For example, the first transmission burst may include the first uplink transmission burst and/or first downlink transmission burst on the first sub-band of the first carrier, and the third transmission burst may include the fourth uplink transmission burst and/or fourth downlink transmission burst on the second sub-band of the first carrier.

A fourth scenario: the first transmission burst and the third transmission burst may be on different carriers. For example, the first transmission burst is on the first carrier, and the third transmission burst is on the second carrier. The first transmission burst may include the first uplink transmission burst and/or first downlink transmission burst on the first carrier, and the third transmission burst may include the fifth downlink transmission burst and/or fifth uplink transmission burst on the second carrier. Optionally, the fifth downlink transmission burst on the second carrier and the fifth uplink transmission burst on the second carrier may be on the same sub-band of the second carrier.

To sum up, in the second embodiment, the first information transmitted on the first carrier may be used to indicate that time-domain resource information of transmission bursts on different sub-bands of the first carrier needs to be determined according to different subcarrier spacings, i.e., the third scenario. Time-domain resource positions of transmission bursts on different sub-bands may be different, for example, there are different ending positions of downlink transmission bursts on different sub-bands for the network device, so that the network device may release idle frequency-domain resources when a load of the network device is reduced, which is favorable for increasing the utilization rate of frequency-domain resources.

Or, the first information transmitted on the first carrier may be used to indicate that time-domain resource information of transmission bursts on different carriers needs to be determined according to different subcarrier spacings, i.e., the fourth scenario. Time-domain resource positions of transmission bursts on different sub-bands may also be different, for example, there are different ending positions of downlink transmission bursts on different carriers for the network device, so that the network device may release the idle frequency-domain resources when the load of the network device is reduced, and the utilization rate of the frequency-domain resources may further be increased.

Optionally, in a specific implementation of the second embodiment, the first information is used to indicate that the first ending position of the first transmission burst needs to be determined according to the first subcarrier spacing, and the first information is further used to indicate that a third ending position of the third transmission burst needs to be determined according to the second subcarrier spacing, an interval between the first ending position and the third ending position being less than or equal to a second preset value.

For example, in the third scenario, the first ending position of the first transmission burst may be a first ending position of the transmission burst on the first sub-band of the first carrier, and the third ending position of the third transmission burst may be a third ending position of the transmission burst on the second sub-band of the first carrier. Or, in the fourth scenario, the first ending position of the first transmission burst may be a first ending position of the transmission burst on the first carrier, and the third ending position of the third transmission burst may be a third ending position of the transmission burst on the second carrier. The first ending position and the third ending position may be different, and under this condition, a time interval between the first ending position and the third ending position is no more than the second preset value.

Optionally, in some embodiments, the second preset value may be 1 ms.

To sum up, in the first embodiment and the second embodiment, the first information transmitted on the first carrier may be used to indicate the determination manner for the time-domain resource information of the downlink transmission burst and/or uplink transmission burst on the first carrier and may further be used to indicate the determination manner for time-domain resource information of downlink transmission bursts and/or uplink transmission bursts on at least two sub-bands of the first carrier. The time-domain resource information of the at least two sub-bands is determined according to the same subcarrier spacing or determined according to different subcarrier spacings. Or, the first information may further be used to indicate a determination manner for time-domain resource information of a downlink transmission burst and/or uplink transmission burst on another carrier, for example, the second carrier. The time-domain resource information of the transmission burst on the second carrier and the time-domain resource information of the transmission burst on the first carrier are determined according to the same subcarrier spacing or determined according to different subcarrier spacings. There are no limits made thereto in the embodiment of the disclosure.

Optionally, in some embodiments, the method 200 may further include the following operation.

The network device transmits a downlink physical channel according to a third subcarrier spacing.

The third subcarrier spacing may be different from the first subcarrier spacing, namely the subcarrier spacing used for transmitting the downlink physical channel may be different from the subcarrier spacing used for determining the downlink transmission burst. That is, after the time-domain resource information of the downlink transmission burst is determined according to the first subcarrier spacing, during practical data transmission, the downlink physical channel may be transmitted according to the third subcarrier spacing different from the first subcarrier spacing. Of course, the network device may also transmit the downlink physical channel according to the first subcarrier spacing. There are no specific limits made thereto in the embodiment of the disclosure.

For example, as illustrated in FIG. 3, the first subcarrier spacing is, for example, 15 kHz, and the network device may determine the time-domain resource information of the first downlink transmission burst, for example, a channel occupancy duration in the first downlink transmission burst or the ending position, according to 15 kHz. During practical data transmission on the time-domain resource corresponding to the first downlink transmission burst, the network device, after channel detection is successful (for example, LBT is successful or Clear Channel Assessment (CCA) is successful), may transmit the downlink physical channel according to a subcarrier spacing the same as or different from the first subcarrier spacing (for example, according to one or more subcarrier spacings in 15 kHz, 30 kHz and 60 kHz).

For another example, as illustrated in FIG. 4, the first carrier may include a sub-band #1 and a sub-band #2, the first information may be used to indicate that the time-domain resource information of the first downlink transmission burst corresponding to the sub-band #1 needs to be determined according to the first subcarrier spacing (for example, 15 kHz) and may further be used to indicate that the time-domain resource information of the second downlink transmission burst corresponding to the sub-band #2 needs to be determined according to the second subcarrier spacing (for example, 30 kHz), and the ending positions of the downlink transmission bursts on the sub-band #1 and the sub-band #2 may be different. Optionally, a time interval between the ending positions may be less than or equal to the second preset value.

During practical data transmission in the sub-band #1 and the sub-band #2, the network device, after successful channel detection (for example, successful LBT or successful CCA) on the sub-bands, may transmit the downlink physical channel in the sub-band #1 according to a subcarrier spacing the same as or different from the first subcarrier spacing (for example, the downlink physical channel may be transmitted on the time-domain resource of the first downlink transmission burst in the sub-band #1 according to one or more subcarrier spacings in 15 kHz, 30 kHz and 60 kHz) and transmit the downlink physical channel in the sub-band #2 according to a subcarrier spacing the same as or different from the second subcarrier spacing (for example, the downlink physical channel may also be transmitted on the time-domain resource of the second downlink transmission burst in the sub-band #2 according to one or more subcarrier spacings in 15 kHz, 30 kHz and 60 kHz).

Optionally, in some embodiments, S220 may specifically include the following operations.

The network device sends the first information to the terminal device according to the first subcarrier spacing through the first time-domain resource on the first carrier; or, the network device sends the first information to the terminal device according to a fourth subcarrier spacing through the first time-domain resource on the first carrier.

The first subcarrier spacing is different from the fourth subcarrier spacing, that is, the subcarrier spacing used for sending the first information and the subcarrier spacing used for determining the downlink transmission burst may be the same and may also be different. Specifically, the network device may determine a downlink control resource used for sending the first information, and the downlink control resource may be determined according to the first subcarrier spacing and may also be determined according to another subcarrier spacing, which is not limited in the embodiment of the disclosure. The downlink control resource is the abovementioned first time-domain resource. Furthermore, the network device may send the first information on the downlink control resource on the first carrier according to the first subcarrier spacing or a subcarrier spacing that is not the first subcarrier spacing, for example, the fourth subcarrier spacing.

Therefore, according to the method for information transmission in the embodiment of the disclosure, the network device may indicate a determination manner for a time-domain resource position of a transmission burst on an unlicensed carrier through indication information. Optionally, if the unlicensed carrier includes at least two sub-bands, the indication information may further be used to indicate that time-domain resource information of transmission bursts in the at least two sub-bands needs to be determined according to the same reference subcarrier spacing (i.e., the first subcarrier spacing) or indicate that the time-domain resource information of the transmission burst in each sub-band needs to be determined according to an independent reference subcarrier spacing. Or, the first information may further be used to indicate that time-domain resource information of transmission bursts on at least two carriers needs to be determined according to the same reference subcarrier spacing or may further be used to indicate that the time-domain resource information of the transmission burst on each carrier needs to be determined according to an independent reference subcarrier spacing. Therefore, the terminal device and the network device may reach an agreement on time-domain resource positions of uplink transmission bursts and/or downlink transmission bursts, and normal data communication between the network device and the terminal device may be implemented.

The signal transmission method according to the embodiments of the disclosure is described above in combination with FIG. 2 to FIG. 4 from the perspective of the network device in detail. Correspondingly, the terminal device may also execute the signal transmission method according to the embodiments of the disclosure in a similar manner, and for simplicity, elaborations are omitted herein.

A device embodiment of the disclosure will be described below in combination with FIG. 5 to FIG. 6 in detail. It is to be understood that the device embodiment corresponds to the method embodiment and similar descriptions may refer to the method embodiment.

Figure 5:
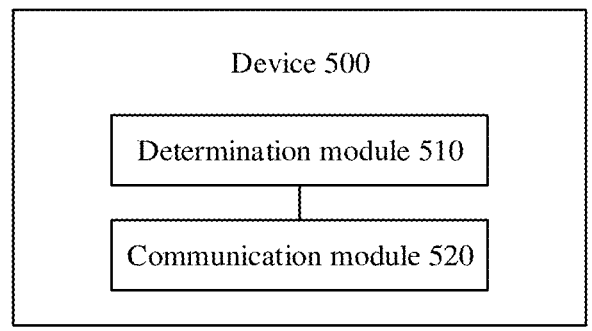
FIG. 5 is a schematic block diagram of a device for information transmission according to an embodiment of the disclosure.

FIG. 5 is a schematic block diagram of a device for information transmission according to an embodiment of the disclosure. The device 500 illustrated in FIG. 5 includes a determination module 510 and a communication module 520.

The determination module 510 is configured to determine a first time-domain resource available on a first carrier, the first time-domain resource being in a first downlink transmission burst.

The communication module 520 is configured to send first information to a terminal device through the first time-domain resource on the first carrier, the first information being used to indicate that time-domain resource information of a first transmission burst needs to be determined according to a first subcarrier spacing.

Optionally, in some embodiments, the time-domain resource information includes at least one of: a starting position; an ending position; a channel occupancy duration; or, a slot format.

Optionally, in some embodiments, the first transmission burst includes at least one of the first downlink transmission burst on the first carrier or a first uplink transmission burst on the first carrier. A frequency-domain resource where the first uplink transmission burst is located at least partially overlaps with a frequency-domain resource where the first downlink transmission burst is located.

Optionally, in some embodiments, the first information is further used to indicate that time-domain resource information of a second transmission burst needs to be determined according to the first subcarrier spacing, and the second transmission burst includes at least one of the following:

a second downlink transmission burst on the first carrier;
a second uplink transmission burst on the first carrier;
a third downlink transmission burst on a second carrier; or,
a third uplink transmission burst on the second carrier.

A frequency-domain resource where the second transmission burst is located does not overlap with a frequency-domain resource where the first transmission burst is located.

Optionally, in some embodiments, the first information is used to indicate that a first ending position of the first transmission burst needs to be determined according to the first subcarrier spacing, and the first information is further used to indicate that a second ending position of the second transmission burst needs to be determined according to the first subcarrier spacing, an interval between the first ending position and the second ending position being less than or equal to a first preset value.

Optionally, in some embodiments, the first preset value is 1 ms.

Optionally, in some embodiments, the first information is further used to indicate that time-domain resource information of a third transmission burst needs to be determined according to a second subcarrier spacing.

The third transmission burst includes at least one of the following:
 a fourth downlink transmission burst on the first carrier;
 a fourth uplink transmission burst on the first carrier;
 a fifth downlink transmission burst on the second carrier; or,
 a fifth uplink transmission burst on the second carrier.

A frequency-domain resource where the third transmission burst is located does not overlap with the frequency-domain resource where the first transmission burst is located.

Optionally, in some embodiments, the first information is used to indicate that the first ending position of the first transmission burst needs to be determined according to the first subcarrier spacing, and the first information is further used to indicate a third ending position of the third transmission burst needs to be determined according to the second subcarrier spacing, an interval between the first ending position and the third ending position being less than or equal to a second preset value.

Optionally, in some embodiments, the second preset value is 1 ms.

Optionally, in some embodiments, the communication module is further configured to:
 transmit a downlink physical channel according to a third subcarrier spacing.

Optionally, in some embodiments, the communication module 520 is specifically configured to:
 send the first information to the terminal device according to the first subcarrier spacing through the first time-domain resource on the first carrier.

Optionally, in some embodiments, the communication module 520 is further configured to:
 determine to send the first information to the terminal device according to a fourth subcarrier spacing through the first time-domain resource on the first carrier.

Therefore, the device for information transmission in the embodiment of the disclosure may indicate a determination manner for a time-domain resource position of a transmission burst on an unlicensed carrier through indication information, and optionally, if the unlicensed carrier includes at least two sub-bands, the indication information may further be used to indicate that time-domain resource information of transmission bursts on the at least two sub-bands needs to be determined according to the same reference subcarrier spacing (i.e., the first subcarrier spacing) or indicate that the time-domain resource information of the transmission burst on each sub-band needs to be determined according to an independent reference subcarrier spacing, or, the first information may further be used to indicate that time-domain resource information of transmission bursts on at least two carriers need to be determined according to the same reference subcarrier spacing or may further be used to indicate that the time-domain resource information of the transmission burst on each carrier needs to be determined according to an independent reference subcarrier spacing. Therefore, the terminal device and the network device may reach an agreement on time-domain resource positions of uplink transmission bursts and/or downlink transmission bursts, and normal data communication between the network device and the terminal device may be implemented.

Specifically, the device 500 may correspond to (for example, configured in or is) the network device described in the method 200, and moreover, each module or unit in the device 500 is configured to execute each operation or processing process executed by the network device in the method 200. For avoiding elaborations, detailed descriptions will be omitted herein.

Figure 6:
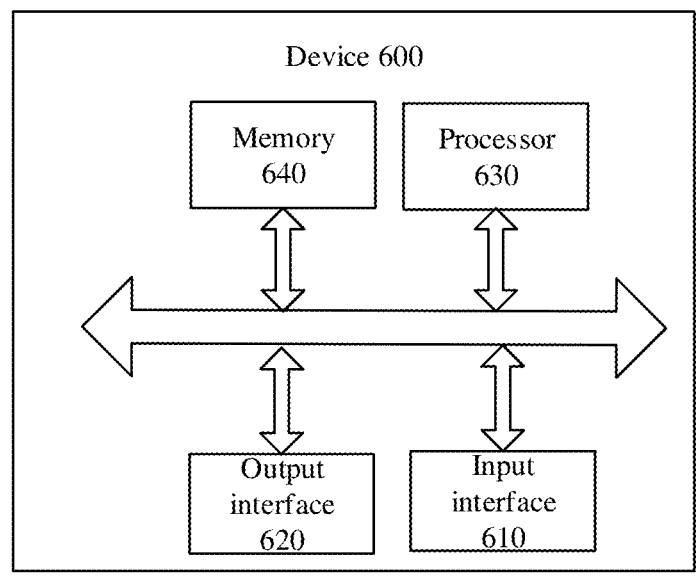
FIG. 6 is a schematic block diagram of a device for information transmission according to another embodiment of the disclosure.

As illustrated in FIG. 6, an embodiment of the disclosure also provides an information transmission device 600. The device 600 may be the device 500 in FIG. 5, and may be configured to execute contents of the network device corresponding to the method 200 in FIG. 2. The device 600 includes an input interface 610, an output interface 620, a processor 630 and a memory 640. The input interface 610, the output interface 620, the processor 630 and the memory 640 may be connected through a bus system. The memory 640 is configured to store a program, instructions or a code. The processor 630 is configured to execute the program instructions or code in the memory 640 to control the input interface 610 to receive a signal, control the output interface 620 to send a signal and complete operations in the method embodiments.

Therefore, according to the information transmission method in the embodiment of the disclosure, the network device may indicate a determination manner for a time-domain resource position of a transmission burst on an unlicensed carrier through indication information, and optionally, if the unlicensed carrier includes at least two sub-bands, the indication information may further be used to indicate that time-domain resource information of transmission bursts on the at least two sub-bands needs to be determined according to the same reference subcarrier spacing (i.e., the first subcarrier spacing) or indicate that the time-domain resource information of the transmission burst on each sub-band needs to be determined according to an independent reference subcarrier spacing, or, the first information may further be used to indicate that time-domain resource information of transmission bursts on at least two carriers needs to be determined according to the same reference subcarrier spacing or may further be used to indicate that the time-domain resource information of the transmission burst on each carrier needs to be determined according to an independent reference subcarrier spacing. Therefore, the terminal device and the network device may reach an agreement on time-domain resource positions of uplink transmission bursts and/or downlink transmission bursts, and normal data communication between the network device and the terminal device may be implemented.

It is to be understood that, in the embodiment of the disclosure, the processor 630 may be a Central Processing Unit (CPU) and the processor 630 may also be another universal processor, a Digital Signal Processor (DSP), an Application Specific Integrated Circuit (ASIC), an Field Programmable Gate Array (FPGA) or another programmable logic device, discrete gate or transistor logic device and discrete hardware component and the like. The universal processor may be a microprocessor or the processor may also be any conventional processor and the like.

The memory 640 may include a Read-Only Memory (ROM) and a Random Access Memory (RAM) and provides an instruction and data for the processor 630. A part of the memory 640 may further include a nonvolatile RAM. For example, the memory 640 may further store information of a device type.

In an implementation process, each content of the method may be completed by an integrated logic circuit of hardware in the processor 630 or instructions in a software form. The contents of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 640. The processor 630 reads information in the memory 640 and completes the contents of the method in combination with hardware. No more detailed descriptions will be made herein to avoid repetitions.

In a specific implementation mode, the determination module 510 of the device 500 in FIG. 5 may be implemented by the processor 630 in FIG. 6, and the communication module 520 of the device 500 in FIG. 5 may be implemented by the input interface 610 and output interface 620 in FIG. 6.

An embodiment of the disclosure also discloses a computer-readable storage medium, which stores one or more programs, the one or more programs including instructions and the instructions being executed by a portable electronic device including multiple applications to enable the portable electronic device to execute the method of the embodiment illustrated in FIG. 2 to FIG. 3.

An embodiment of the disclosure also discloses a computer program, which includes instructions, the computer program being executed by a computer to enable the computer to execute corresponding flows in the method of the embodiment illustrated in FIG. 2 to FIG. 3.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for information transmission, comprising:
   determining, by a network device, a first time-domain resource available on a first carrier, wherein the first carrier is an unlicensed carrier and the first time-domain resource is in a first downlink transmission burst; and
   sending, by the network device, first information to a terminal device through the first time-domain resource on the first carrier, wherein the first information is used to indicate time-domain resource information of a first transmission burst according to a first subcarrier spacing;
   wherein the time-domain resource information comprises at least one of:
   an end of the first transmission burst; a channel occupancy duration; or a slot format of a transmission burst;
   wherein the first information is further used to indicate time-domain resource information of a third transmission burst according to a second subcarrier spacing,
   wherein the third transmission burst comprises at least one of:
   a fourth downlink transmission burst on the first carrier;
   a fourth uplink transmission burst on the first carrier;
   a fifth downlink transmission burst on a second carrier; or,
   a fifth uplink transmission burst on the second carrier, and
   wherein a frequency-domain resource corresponding to the third transmission burst does not overlap with the frequency-domain resource corresponding to the first transmission burst.

2. The method of claim 1, wherein the first transmission burst comprises at least one of the first downlink transmission burst on the first carrier or a first uplink transmission burst on the first carrier, and a frequency-domain resource corresponding to the first uplink transmission burst at least partially overlaps with a frequency-domain resource corresponding to the first downlink transmission burst.

3. The method of claim 1, wherein the first information is further used to indicate time-domain resource information of a second transmission burst according to the first subcarrier spacing,
wherein the second transmission burst comprises at least one of:
a second downlink transmission burst on the first carrier;
a second uplink transmission burst on the first carrier;
a third downlink transmission burst on a second carrier; or
a third uplink transmission burst on the second carrier, and
a frequency-domain resource corresponding to the second transmission burst does not overlap with a frequency-domain resource corresponding to the first transmission burst.

4. The method of claim 1, wherein the second carrier is an unlicensed carrier.

5. The method of claim 1, wherein the first time-domain resource comprises: a time-domain resource, configured by the network device, for transmitting a downlink control channel in the first downlink transmission burst; and
wherein the time-domain resource, configured by the network device, for transmitting the downlink control channel in the first downlink transmission burst comprises: a time-domain resource in a control resource set (CORESET).

6. The method of claim 1, wherein the first subcarrier spacing comprises: a subcarrier spacing configured by the network device.

7. The method of claim 1, wherein the second subcarrier spacing comprises: a subcarrier spacing configured by the network device.

8. A device for information transmission, comprising:
a processor; and
a memory storing computer readable instructions executable by the processor,
wherein the processor is configured to:
determine a first time-domain resource available on a first carrier, wherein the first carrier is an unlicensed carrier and the first time-domain resource is in a first downlink transmission burst; and
send, through an output interface, first information to a terminal device through the first time-domain resource on the first carrier, wherein the first information is used to indicate time-domain resource information of a first transmission burst according to a first subcarrier spacing;
wherein the time-domain resource information comprises at least one of:
an end of the first transmission burst; a channel occupancy duration; or a slot format of a transmission burst;
wherein the first information is further used to indicate time-domain resource information of a third transmission burst according to a second subcarrier spacing,
wherein the third transmission burst comprises at least one of:
a fourth downlink transmission burst on the first carrier;
a fourth uplink transmission burst on the first carrier;
a fifth downlink transmission burst on a second carrier; or
a fifth uplink transmission burst on the second carrier, and wherein a frequency-domain resource corresponding to the third transmission burst does not overlap with the frequency-domain resource corresponding to the first transmission burst.

9. The device of claim 8, wherein the first transmission burst comprises at least one of the first downlink transmission burst on the first carrier or a first uplink transmission burst on the first carrier, and a frequency-domain resource corresponding to the first uplink transmission burst at least partially overlaps with a frequency-domain resource corresponding to the first downlink transmission burst.

10. The device of claim 8, wherein the first information is further used to indicate time-domain resource information of a second transmission burst according to the first subcarrier spacing,
wherein the second transmission burst comprises at least one of:
a second downlink transmission burst on the first carrier;
a second uplink transmission burst on the first carrier;
a third downlink transmission burst on a second carrier; or
a third uplink transmission burst on the second carrier, and
a frequency-domain resource corresponding to the second transmission burst does not overlap with a frequency-domain resource corresponding to the first transmission burst.

11. The device of claim 8, wherein the second carrier is an unlicensed carrier.

12. The device of claim 8, wherein the first time-domain resource comprises: a time-domain resource for transmitting a downlink control channel in the first downlink transmission burst; and
wherein the time-domain resource for transmitting the downlink control channel in the first downlink transmission burst comprises: a time-domain resource in a control resource set (CORESET).

13. A non-transitory computer readable storage medium having stored thereon computer readable instructions which, when executed by a processor, cause the processor to perform one or more actions comprising:
determining, by a network device, a first time-domain resource available on a first carrier, wherein the first carrier is an unlicensed carrier and the first time-domain resource is in a first downlink transmission burst; and
sending, by the network device, first information to a terminal device through the first time-domain resource on the first carrier, wherein the first information is used to indicate time-domain resource information of a first transmission burst according to a first subcarrier spacing;
wherein the time-domain resource information comprises at least one of:
an end of the first transmission burst; a channel occupancy duration; or a slot format of a transmission burst;
wherein the first information is further used to indicate time-domain resource information of a third transmission burst according to a second subcarrier spacing,
wherein the third transmission burst comprises at least one of:
a fourth downlink transmission burst on the first carrier;
a fourth uplink transmission burst on the first carrier;
a fifth downlink transmission burst on a second carrier; or, a fifth uplink transmission burst on the second carrier, and wherein a frequency-domain resource corresponding to the third transmission burst does not overlap with the frequency-domain resource corresponding to the first transmission burst.

14. The non-transitory computer readable storage medium of claim 13, wherein the first transmission burst comprises at least one of the first downlink transmission burst on the first carrier or a first uplink transmission burst on the first carrier, and a frequency-domain resource corresponding to the first uplink transmission burst at least partially overlaps with a frequency-domain resource corresponding to the first downlink transmission burst.

15. The non-transitory computer readable storage medium of claim 13, wherein the first information is further used to indicate time-domain resource information of a second transmission burst according to the first subcarrier spacing, wherein the second transmission burst comprises at least one of:
   a second downlink transmission burst on the first carrier;
   a second uplink transmission burst on the first carrier;
   a third downlink transmission burst on a second carrier; or
   a third uplink transmission burst on the second carrier, and
   a frequency-domain resource corresponding to the second transmission burst does not overlap with a frequency-domain resource corresponding to the first transmission burst.

16. The non-transitory computer readable storage medium of claim 13, wherein the second carrier is an unlicensed carrier.

17. The non-transitory computer readable storage medium of claim 13, wherein the first time-domain resource comprises: a time-domain resource for transmitting a downlink control channel in the first downlink transmission burst; and
   wherein the time-domain resource for transmitting the downlink control channel in the first downlink transmission burst comprises: a time-domain resource in a control resource set (CORESET).

18. The non-transitory computer readable storage medium of claim 13, wherein the first subcarrier spacing comprises: a subcarrier spacing configured by the network device.

19. The non-transitory computer readable storage medium of claim 13, wherein the second subcarrier spacing comprises: a subcarrier spacing configured by the network device.

* * * * *